United States Patent
Paola et al.

(10) Patent No.: US 10,341,420 B1
(45) Date of Patent: Jul. 2, 2019

(54) APPROACHES FOR PREPARING AND DELIVERING BULK DATA TO CLIENTS

(71) Applicant: Amazon Technologies, Inc., Reno, NV (US)

(72) Inventors: Christopher Mark Paola, Seattle, WA (US); Jonathan Andrew Hedley, Seattle, WA (US); Christopher William Holt, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 319 days.

(21) Appl. No.: 15/294,463

(22) Filed: Oct. 14, 2016

(51) Int. Cl.
*G06F 15/16* (2006.01)
*H04L 29/08* (2006.01)
*H04L 29/06* (2006.01)

(52) U.S. Cl.
CPC .............. *H04L 67/06* (2013.01); *H04L 67/02* (2013.01); *H04L 67/10* (2013.01); *H04L 67/141* (2013.01); *H04L 67/34* (2013.01); *H04L 67/42* (2013.01)

(58) Field of Classification Search
CPC ......... H04L 67/06; H04L 67/02; H04L 67/10; H04L 67/141; H04L 67/34; H04L 67/42
USPC ........................................................ 709/227
See application file for complete search history.

(56) References Cited

U.S. PATENT DOCUMENTS

| | | | |
|---|---|---|---|
| 9,639,564 B2 * | 5/2017 | Isherwood, Jr. | G06F 17/30705 |
| 9,825,881 B2 * | 11/2017 | Johnston | H04L 47/827 |
| 9,866,635 B2 * | 1/2018 | Maturana | H04L 67/1097 |
| 9,928,377 B2 * | 3/2018 | Narayanaswamy | G06F 21/6218 |
| 9,959,273 B2 * | 5/2018 | Bergman | G06F 17/30 |
| 9,971,574 B2 * | 5/2018 | Mathew | G06F 8/40 |
| 9,973,475 B2 * | 5/2018 | Jain | H04L 63/0281 |
| 9,977,654 B2 * | 5/2018 | Coslovi | G06F 8/20 |
| 9,990,188 B2 * | 6/2018 | Khot | G06F 8/51 |
| 10,042,903 B2 * | 8/2018 | Dhayapule | G06F 17/30563 |
| 10,073,679 B2 * | 9/2018 | Straub | G06F 8/34 |
| 10,078,501 B2 * | 9/2018 | Narayanan | G06F 8/35 |
| 10,089,489 B2 * | 10/2018 | Goldfarb | H04L 9/3239 |
| 10,095,759 B1 * | 10/2018 | Cappiello | G06F 17/30563 |
| 10,101,889 B2 * | 10/2018 | Prophete | G06F 3/04845 |
| 2018/0025048 A1 * | 1/2018 | Semlani | G06Q 10/00 715/738 |
| 2018/0041578 A1 * | 2/2018 | Lee | H04L 47/70 |
| 2018/0293517 A1 * | 10/2018 | Browne | G06Q 10/00 |

\* cited by examiner

*Primary Examiner* — Melvin H Pollack
(74) *Attorney, Agent, or Firm* — Hogan Lovells US LLP

(57) ABSTRACT

Approaches are described for a client (e.g., an application executing on a computing device) requiring a particular storage format to provide information describing its storage format to a service, such as a multi-tenant computing environment. The service contains data that the client desires to acquire, but in various embodiments, the data on the service is in a different storage format than the format required by the client. The service receives the information describing the storage format and processes the data accordingly, and then provides the processed data to the client in the format required by the client.

20 Claims, 7 Drawing Sheets

APPROACHES FOR PREPARING AND DELIVERING BULK DATA TO CLIENTS

BACKGROUND

Users are increasingly utilizing electronic devices to obtain and utilize various types of information. Applications executing on an electronic device may store and access tremendous amounts of data. Some applications may desire to acquire some or all of this data from a remote server, which may not provide the data in a format desired by the application. This can impose large bandwidth and/or processing requirements on the electronic device, which can disrupt normal operation of the device and be time consuming and potentially frustrating for a user.

BRIEF DESCRIPTION OF THE DRAWINGS

Various embodiments in accordance with the present disclosure will be described with reference to the drawings, in which.

DETAILED DESCRIPTION

Figure 1:
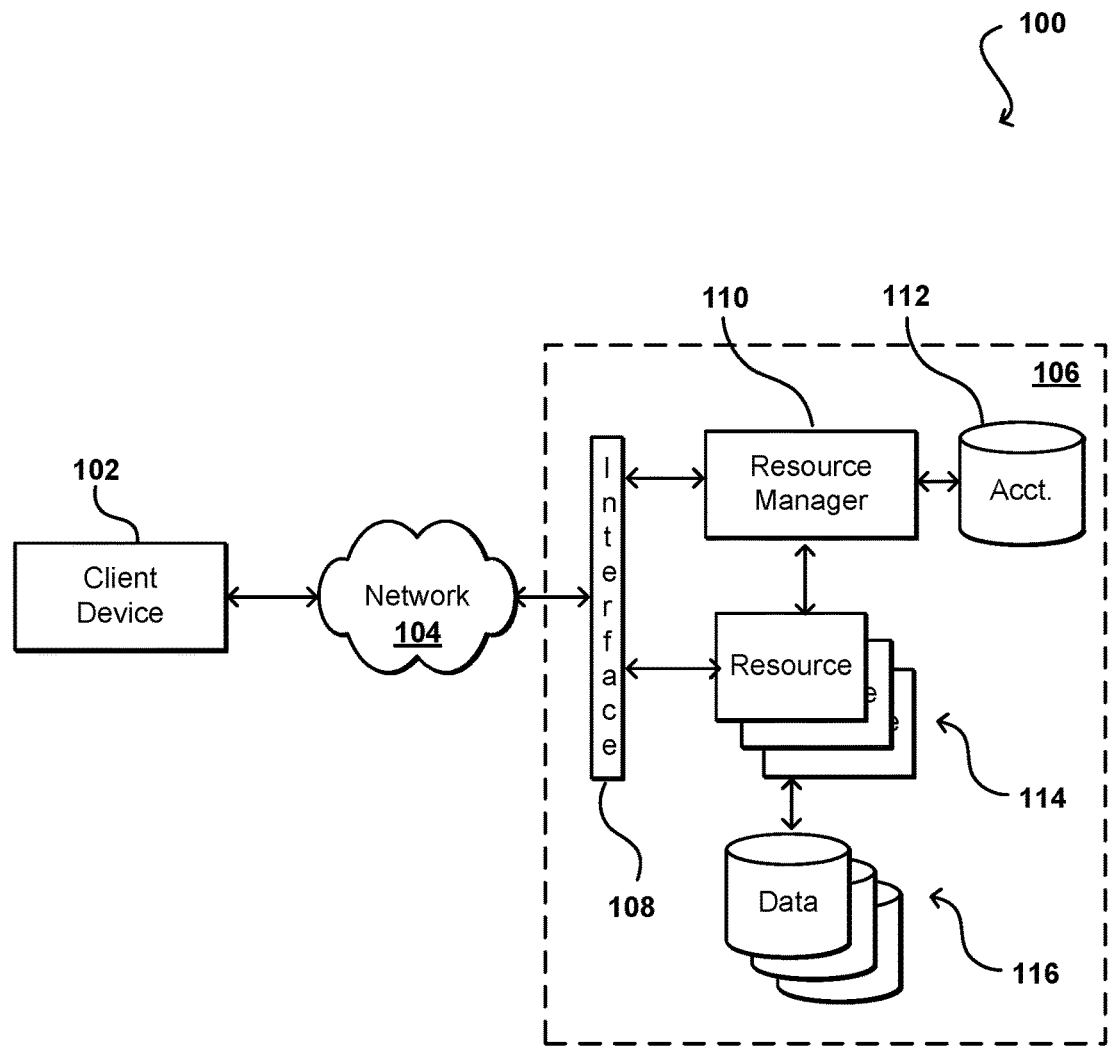
FIG. 1 illustrates an example environment in which various embodiments can be implemented.

Systems, devices and methods in accordance with various embodiments of the present disclosure may overcome one or more of the aforementioned and other deficiencies experienced in conventional approaches for delivering data to client devices over a network. In particular, various embodiments enable a client to describe its data format to a service, which can then utilize the description to generate a new data set for the client in its particular format that can be delivered to the client without any additional processing needed.

According to various embodiments, a set of data (e.g., a database of metadata associated with digital images) is stored at a remote service, such as a multi-tenant computing environment (i.e., a "cloud computing" environment) or some other computing environment such as a storage device of a single server. A client (e.g., an application executing on a mobile computing device) sends a request to the remote service for some or all of the set of data stored at the service. According to various embodiments, the request is for the service to create a database that the client can receive and use, which may be in a different storage format (e.g., having a different schema, a different data model, having different data types, etc.) than the data as stored at the client. Included with the request (or separately) is a description of the storage format desired by the client. According to various embodiments, the description of the storage format may comprise one or more files. For example, a first file (e.g., Structured Query Language (SQL)) may contain a description of the database schema desired by the client, while a second file may contain a description of the data model desired by the client. For example, this file may be a JavaScript Object Notation (JSON) file that defines a mapping from the data model as used by the service for the particular data set to a data model used by the client. A third file may comprise instructions (e.g., SQL) to execute on the data set after it has been transformed into the client format and stored; e.g., data sanitizing steps, data normalization steps, conversion of data type such as date formats, etc. According to various embodiments, the description of the client storage format may comprise one or more files operable to accomplish one or more of the above-described steps.

In response to receiving the description of the client storage format, the server determines a transformation to apply to the set of data stored at the service. This transformation may include steps based on the description sent to the service; for example, a database according to the client database schema may be created, for example by executing SQL commands in a file received from the client. The created database may then be populated with data from the service set of data, for example by applying the mapping between the client data model and the server data model and populating the new database accordingly. The database may then be further processed, for example by performing data normalization according to instructions obtained from the client. The new database may be created one node, record, and/or block at a time until all data is populated, and the new database is stored at the service. In various embodiments, a link to access the transformed database is provided to the client, which can then download the database and use it without any additional processing being required locally.

According to various embodiments, data blocks of the database being created at the service may be filled with transformed data (e.g., a plurality of records) and stored at the service. As these bytes are stored at the service, they may substantially simultaneously be "pushed" to the client in a data stream, for example by a Hypertext Transfer Protocol (HTTP) server or similar technology that receives a request for the data from the client and provides each chunk of data in response as each chunk is stored at the service. According to various embodiments, this streaming may provide a read-only view into the data as it is being stored at the service and allow the client to use the data as the service is producing it. The data blocks being provided to the client may each be associated with various data such as an offset value that define positions of the data blocks in the database, so that the database may be assembled at the client as each chunk is received rather than from the "top-down."

According to various embodiments, as the data is being written (e.g., to a B-Tree data structure) to storage in the service environment, data blocks of the new database are being filled. In some approaches, the service may wait for a threshold amount of time to see if a particular block is going to be filled; if the block is not filled within a threshold amount of time, then the block is stored and streamed to the client as discussed herein. This allows data to be made available to the client sooner than if the service were to wait for an unspecified amount of time for each block to be filled before committing the block and streaming it to the client.

Accordingly, approaches in accordance with various embodiments improve the operation and performance of computing devices, such as those on which they are implemented, by reducing computing resources needed to download and process data, among other advantages. Approaches in accordance with various embodiments additionally improves the relevant technologies of data management, data processing, local and remote storage, file transmission, and the like through specific techniques that achieve an improved technological result. By utilizing a data description to prepare a compatible version of data (e.g., metadata) on a remote service rather than downloading an incompatible data set to a computing device piecemeal and then processing the data set to achieve a compatible result, the computing device achieves measurable efficiencies in both bandwidth and processor load.

Previous approaches may utilize a large data set stored remotely (e.g., in the "cloud") in one format, and offer this large data set to a client device (e.g., an "app" on a smart phone, tablet, etc.) in response to a request. For example, an application (e.g., a photo management application) executing for the first time on a portable computing device may under current approaches request for a portion of the large data set stored at a service (e.g., metadata for 2,000 images, 2,000 email messages, etc.), which is retrieved by the service from its data store and transmitted over finite bandwidth to the relatively lower-powered computing device, which must then process the portion of the data set in order to make it compatible with the device's or the app's local storage format. This requires not only the bandwidth to download the data set, but also adds time and resources necessary to allocate memory, reserve processor cycles, write to local storage over and over, use battery power, etc. This is an inefficient use of resources by the client device. Approaches described herein solve these and other inherent disadvantages of prior approaches by leveraging the relatively greater processing power and storage capacity of multi-tenant computing environments, for example, to perform necessary processing of a data set and deliver the data set in a compatible format to a client device without the need for repeated calls and transfers and in a format ready for immediate use. According to various embodiments, the approaches described herein are advantageous not only for file transfer of data between a client device and a service, but also may be utilized in peer-to-peer transmissions, as a generic Application Programming Interface (API) implementation for large-scale data transfer, for server-to-server communication, and the like. Implementations are not limited to specific types of computing devices, and may be implemented with wearable devices such as virtual or augmented reality devices, set-top boxes, etc.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

FIG. 1 illustrates an example environment 100 in which aspects of the various embodiments can be implemented. In this example a user is able to utilize a client device 102 to submit requests across at least one network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

Unlike many conventional environments, the resource manager and other such components in such a programmatically-controlled environment can provide significant visibility into the operation of the environment infrastructure. Unfortunately, the resource manager often will not be able to gain visibility or insight into the operation of a particular resource, physical or virtual, that has been allocated for use by a particular customer. As an example, a resource provider is often unable to determine which ports should be open or closed on a particular host machine, whether a physical or virtual host allocated to a customer. In certain environments a set of log data can be generated that indicates when packets have been passed or denied by a host-based firewall, such as may be used to implement security groups. It is difficult for the provider to determine, however, how those firewall rules align with the execution of the host machine or machine instance, where the machine is a virtual machine operating on a physical host and that host can execute multiple concurrent "instances" of a virtual machine on behalf of the same, or different, customers.

A potential misconfiguration in such an environment corresponds to a firewall that permits traffic to a closed port on a host machine. If at any point a customer executes a service on that host port, the service can be exposed to an external entity or network by the port with the permitted state, or "hole," in the corresponding firewall. As mentioned, in some instances this can correspond to a valid state, such as where the customer has taken down a web server for maintenance and will eventually be restarting the server. In such a situation a permitted state port (e.g., TCP port 80) in a firewall may make sense even where port 80 on the web server, or host machine, is presently closed. In other cases, however, this may be a misconfiguration for which the customer should be notified in order to avoid any unintended access or exposure. As mentioned, it may not be possible for the resource provider to log into, or otherwise access, the machine instance to determine whether or not a service should be actively listening on a particular port. While a customer might be willing to execute an agent or other component or process for reporting that information, not all customers will be willing to provide that information or support such an agent.

Accordingly, approaches in accordance with various embodiments can attempt to identify potential misconfigurations by sending test packets to various ports and monitoring the responses received. For any instance where an expected response is not received, or where an unexpected response is received, a notification can be provided indicating that there is a potential misconfiguration resulting in this mismatch. A port scanning service, or other such system or service, can be configured to probe the various ports to determine whether corresponding ports are open or closed, or if there is a mismatch in state. The packets or test messages can be sent from an outside network or environment, a different sub-environment, or from within a sub-environment, among other such options.

Figure 2:
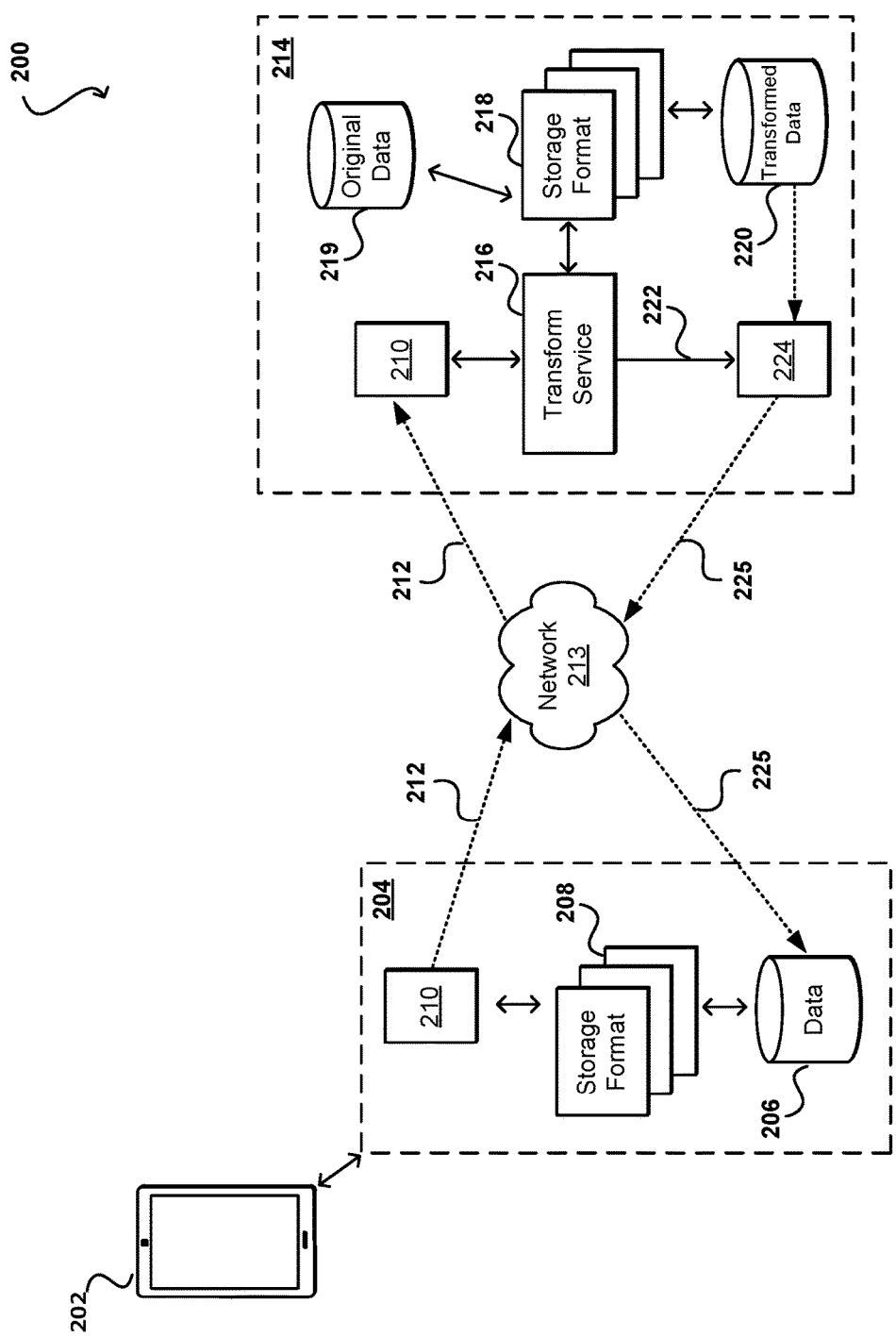
FIG. 2 illustrates an example system to transform and deliver data to a client, in accordance with various embodiments.

FIG. 2 illustrates an example system 200 to transform and deliver data to a client, in accordance with various embodiments. In the example 200 of FIG. 2, a client computing device 202 is illustrated. As discussed herein, the client computing device 202 may be a mobile device, a set-top box, or even a "desktop" computer in various embodiments. The client computing device 202 has available storage 204 that may comprise data 206, such as a database, and which may comprise a particular storage format 208. For example, a storage format may comprise a particular client-specific format (e.g., application-specific, device-specific, OS-specific, etc.) that includes a particular database schema, a particular data model, etc.

According to an embodiment, the client computing device 202 generates one or more files 210 that describes its local storage format. While a "file" is discussed herein, the description of the local storage format may not be so limited; for example, the one or more files 210 may comprise a transformation specification/description that can be represented in text or other embodiment. As an example, the transformation description may be capable of being typed into an input element (e.g., a text input box displayed on client device 202, an input box on a web page in communication with service 214, or some third-party computing device or website that is capable to transmitting the input to service 214, etc.) that is capable of transmitting the transformation description to the service 214 For example, the client computing device 202 may generate a file 210 that defines the client's local SQL database schema, while in other embodiments, one or more files 210 may be generated independently of the client computing device 202; for example, by an application developer, and then transmitted or otherwise communicated to service 214, and the one or more files 210 then being capable of being referenced by a client computing device 202 or application executing thereon, for example. While SQL is used in various examples, it should be understood that various embodiments are not necessarily limited to specific technology. This file may comprise SQL commands in a text file that when executed, is capable of generating or configuring a database containing the described schema. The client computing device 202 may generate another file 210 that defines a mapping from the client's 202 data model to the service's 214 data model. For example, the file may be a JSON file that has mappings from the service's 214 data model to the client 202 data model that maps JSON path query expressions and the results of those expressions to a column in the new database. The client computing device 202 may generate another file 210, such as a SQL file, that operates as a finalization script applied to data after the new database has been generated, as described herein. For example, the script may include commands to normalize the new data, sanitize the new data, and/or otherwise prepare the data for ultimate consumption by the client computing device 202.

According to various embodiments, the one or more files 210 are uploaded 212 through a network connection 213 to a multi-tenant computing environment 214 e.g., (a "service"), although as described above, the one or more files may comprise a transformation description that may take various forms, such as a plain text representation that is sent to or received by the service 214, for example as one or more files 210 over a network connection 213 or as text typed into an interface element and then transmitted to service 214 over a network 213. The service 214 contains a copy of the data 220 desired by the client computing device 202, and the data 220 has a particular storage format 218, which may be partially or fully different from the client storage format 208, which is various embodiments renders data 206 stored at the client computing device 202 to be incompatible with data 220 stored at the service 214, which is why the data 220 at the service cannot simply be downloaded to the client computing device 202 upon request without the additional techniques described herein.

According to various embodiments, upon receiving the one or more files 210 from the client computing device 202, the service 214 may use the data contained within the one or more files 210 (e.g., a transformation description) as part of a data transformation service 216, which operates to transform the original data 219 stored at the service from the service storage format 218 to the client storage format 208 based at least on the data in the one or more files 210, and store the transformed data, for example in a new database 220. For example, transforming metadata from the service's representation to the client's representation using the description provided by the client computing device 202. In an embodiment, the service 214 applies the one or more files 210 to its data set 219, which may perform tasks such as generating a new data set 220 (e.g., database) that has a schema and data model compatible with the client computing device 202, and maps data from the service data set 220 to the new data set 220; for example, a mapping of one column in one data set to a column in the new data set 220. According to various embodiments, the dataset 220 may be processed further (e.g., by applying part of the transformation description such as a finalization script) to generate a data set 224 for transmission 225 to the client computing device; for example, the transformed data 220 may contain some data that is superfluous for the needs of the client computing device 202 (e.g., the application(s) executing thereon), and various portions of data (e.g., tables, rows, columns, records, etc.) may be pruned or otherwise left out of the data set 224 to be transmitted 225 to the client 202, although in various embodiments, the transformed data 220 and the data set 224 for transmission may be identical (e.g., the transformation description may operate directly on the transformed data 220, such as through a finalization script), and therefore no separate data set 224 would be prepared; e.g., the transformed data 220 would be sent to the client 202.

According to various embodiments, the service 214 may provide an API usable by the client computing device 202 to tell the service 214 about its storage format (e.g., schema, model, etc.) in lieu of or in addition to providing the one or more files 210 to the service 214. By allowing a client computing device 202 (or application executing on the client computing device 202) to define their data format, structure, etc., then multiple applications executing on the client computing device 202 can each maintain their data in whatever format is desired, as well as being able to modify its own format, schema, model, etc. on demand without requiring the service 214 to change the storage format 218 used for the data 220 ultimately requested by the client computing device 202.

According to various embodiments, once the new data set 224 is generated after the transformation process, it is provided to the client computing device 202. For example, it may be directly transmitted 224 over the network 213 and stored in a data store 206 of the client computing device 202. In various embodiments, a link enabling access to the new data set 224 may be generated by the service 214 and provided 224 to the client computing device 202 over the network 213 upon request and upon completion of the new data set 224 being stored at the service 214.

According to an embodiment, part of the transformation may comprise "finalization" steps once the new data set 224 is generated; for example, data normalization, sanitizing, etc. For example, a client application executing on the client computing device 202 may use a database schema that expects a UNIX time (e.g., integer-based value), while the database schema of the data 220 stored at the service 214 may use a text-based date format in its schema. A finalization step may use a function (e.g., SQL-Lite) to convert dates between the two formats.

Figure 3:
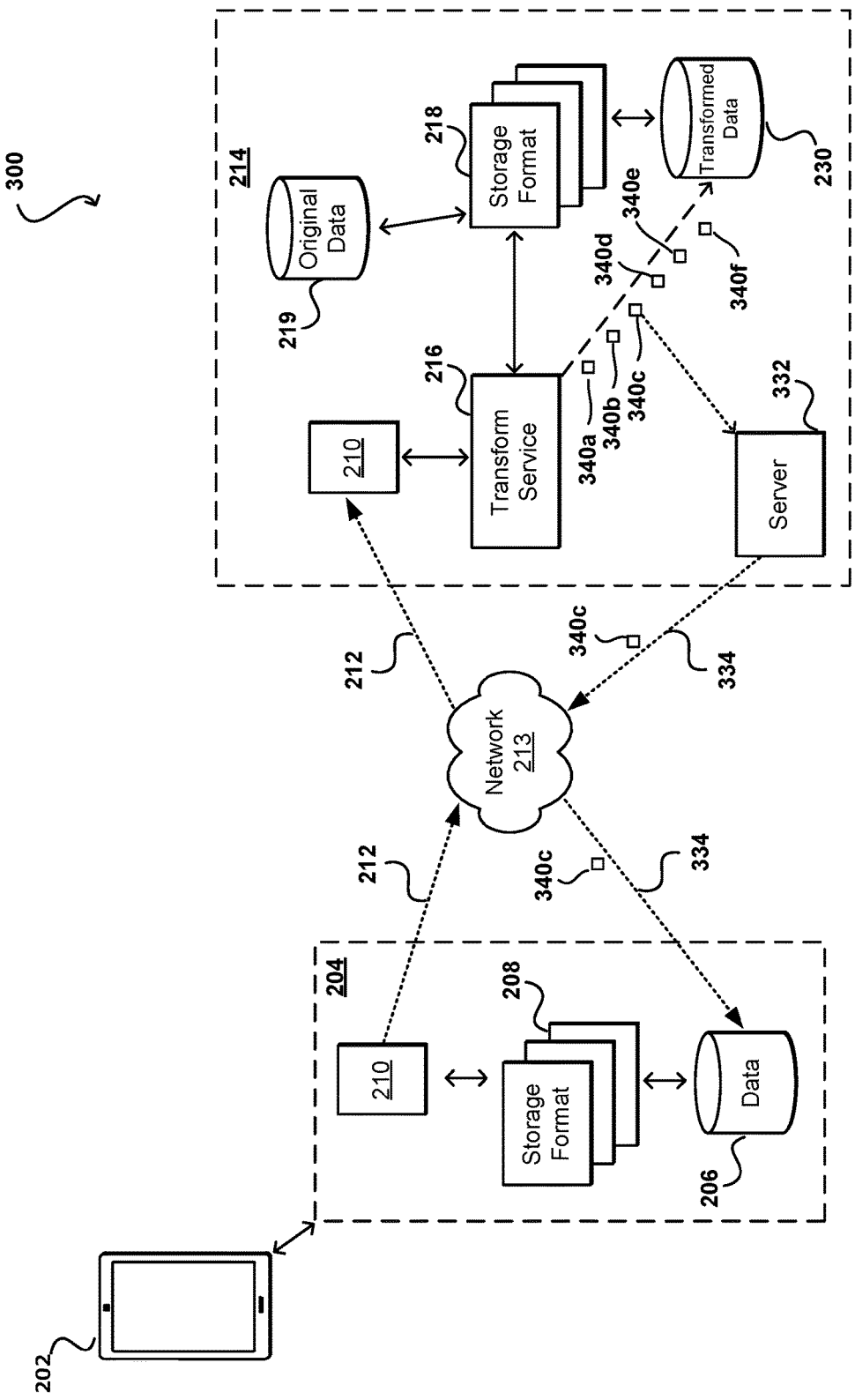
FIG. 3 illustrates an example system to transform and deliver a stream of data to a client, in accordance with various embodiments.

FIG. 3 illustrates an example system 300 to transform and deliver a stream of data to a client, in accordance with various embodiments. It should be understood that reference numbers may be carried over between figures for similar components for purposes of explanation, but that such use should not be interpreted as a limitation on the various embodiments. According to various embodiments, approaches such as those described in FIG. 3 stream chunks 340a-340f of a transformed dataset incrementally, for example as each chunk is generated by the service 214. The client computing device 202 merges the chunks 340a-340f into a client data set 206, for example by writing bytes to a database file 206 on a storage device of the client computing device 202 without any application-level parsing or processing.

In the example 300 of FIG. 3, the transform service 316 of the service 314 writes blocks 340a-340f of the transformed/converted data to a data store 330 of the service 314. According to an embodiment, an existing SQL Lite stack may be used, and as a command processes through the layers of the stack, a hook into an OS interface layer responsible for writing/reading/locking/etc. blocks 340a-340f to the data store 230 is used to embed a server 332 (e.g., an HTTP server), although various embodiments may not be so limited.

As the blocks 340a-340f are written out, the server 332 has a view into the blocks 340a-340f and provides an interface to the client computing device 202 to view the blocks 340a-340f. For example, a single block 340c may be exposed to the data server 332 as it is being written to the data store 230, and substantially simultaneously be provided 334 to the client computing device 202 over the network 213 via the server 232 or similar component. The block 340c may contain data as well as an offset value, which allows the client computing device 202 to receive 334 the block 340c and replicate the data set 330, for example one block at a time. In this manner, it is not necessary for the entire transformed data set 230 to be stored prior to transmitting it to the client computing device 202, and the client computing device 202 does not need to "build" the new data set from the top-down or in any particular order because a serialized view of the database is being written out in the blocks 340a-340f. In this manner, the client computing device 202 may utilize the fully-transformed data one chunk at a time (e.g., as they are received) rather than receiving chunks that require further processing and/or transformation prior to being utilized. In an embodiment, various data blocks may be filled and transmitted to the client 202, and subsequently those same data blocks (e.g., at the service 214) may be modified and/or updated, such that the modified data blocks may be transmitted to the client 202 without the need for the entire transformed data set 230 being transmitted.

Figure 4:
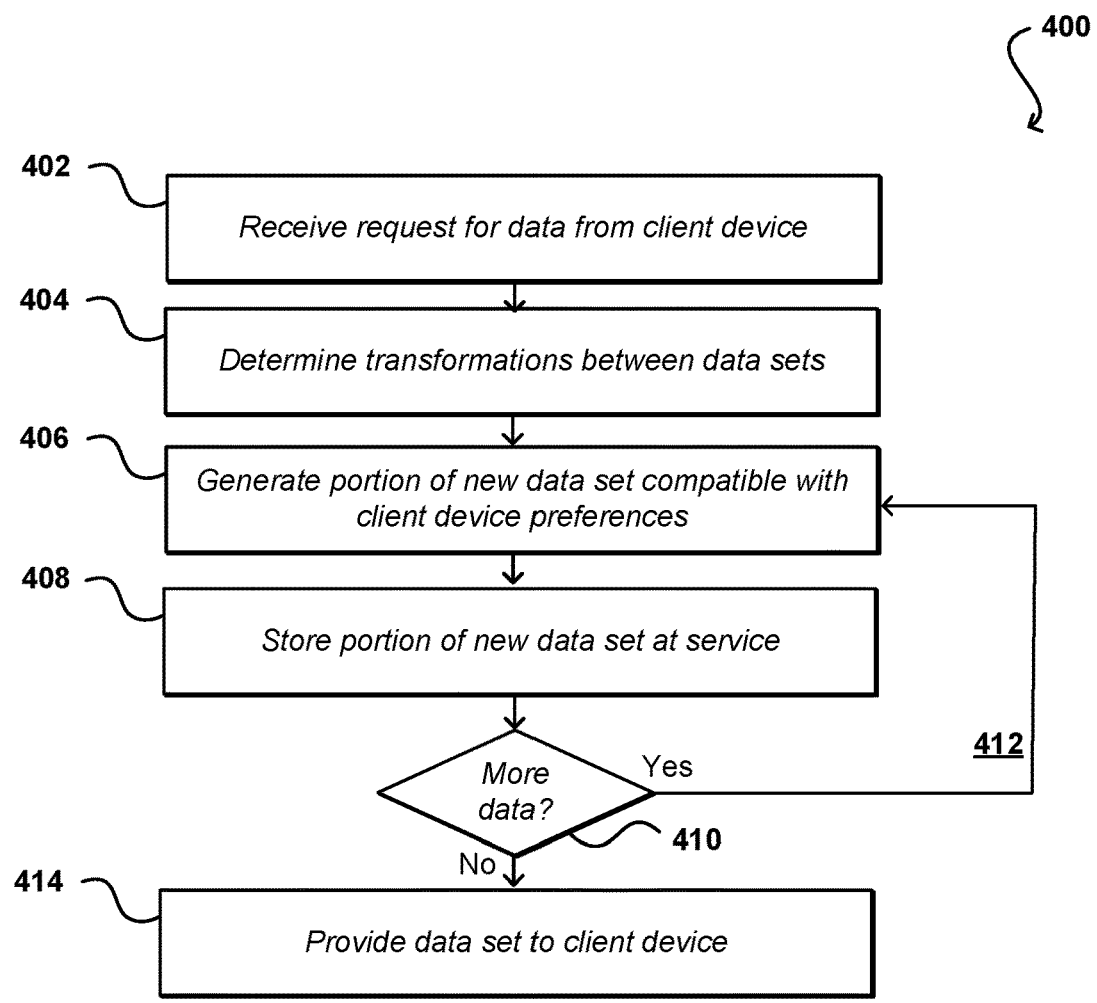
FIG. 4 illustrates an example process for preparing and delivering bulk data to clients, in accordance with various embodiments.

FIG. 4 illustrates an example process for preparing and delivering bulk data to clients, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In the example 400 of FIG. 4, a request is received 402 for a new data set, for example from a client device and/or an application executing on a client device. According to various embodiments, the request may include or otherwise reference various information describing a data format associated with the requesting entity. In an embodiment, the request may be made via an API call that includes the information. The information may be included as one or more files, each file including different information and being in one of several formats. For example, a first file may be in a SQL format and include a description of a database schema and provide instructions which when executed creates a database with the appropriate schema. Another file may be in JSON format and describe mapping between the data as desired by the requesting entity and the data as stored, for example by a service at which the desired data is stored. This mapping may comprise a correspondence between different data models, for example.

Based at least on the information, a transformation between the data sets (e.g., the desired data set at the client and the existing data set at the service) is determined 404. This may include, for example, executing a SQL file that creates a database having the desired schema and then utilizing the mapping data to copy data between the existing database and the new database. Once a new database is created, at least a portion (e.g., rows, blocks, nodes, etc.) of the existing data set is transformed to generate the new data set 406 that is compatible with the requesting entity. The new data set is stored at the service 408. For example, it could be stored in a database, in memory, on disk, etc., or made available to the service in some fashion, such as being stored on a third party server, etc. A determination is made 410 if any further data is to be generated and stored. If so, then the process loops back to step 406; otherwise, the data set is provided 414 to the requesting entity, for example by providing a link at which the new data set may be accessed (e.g., downloaded).

Figure 5:
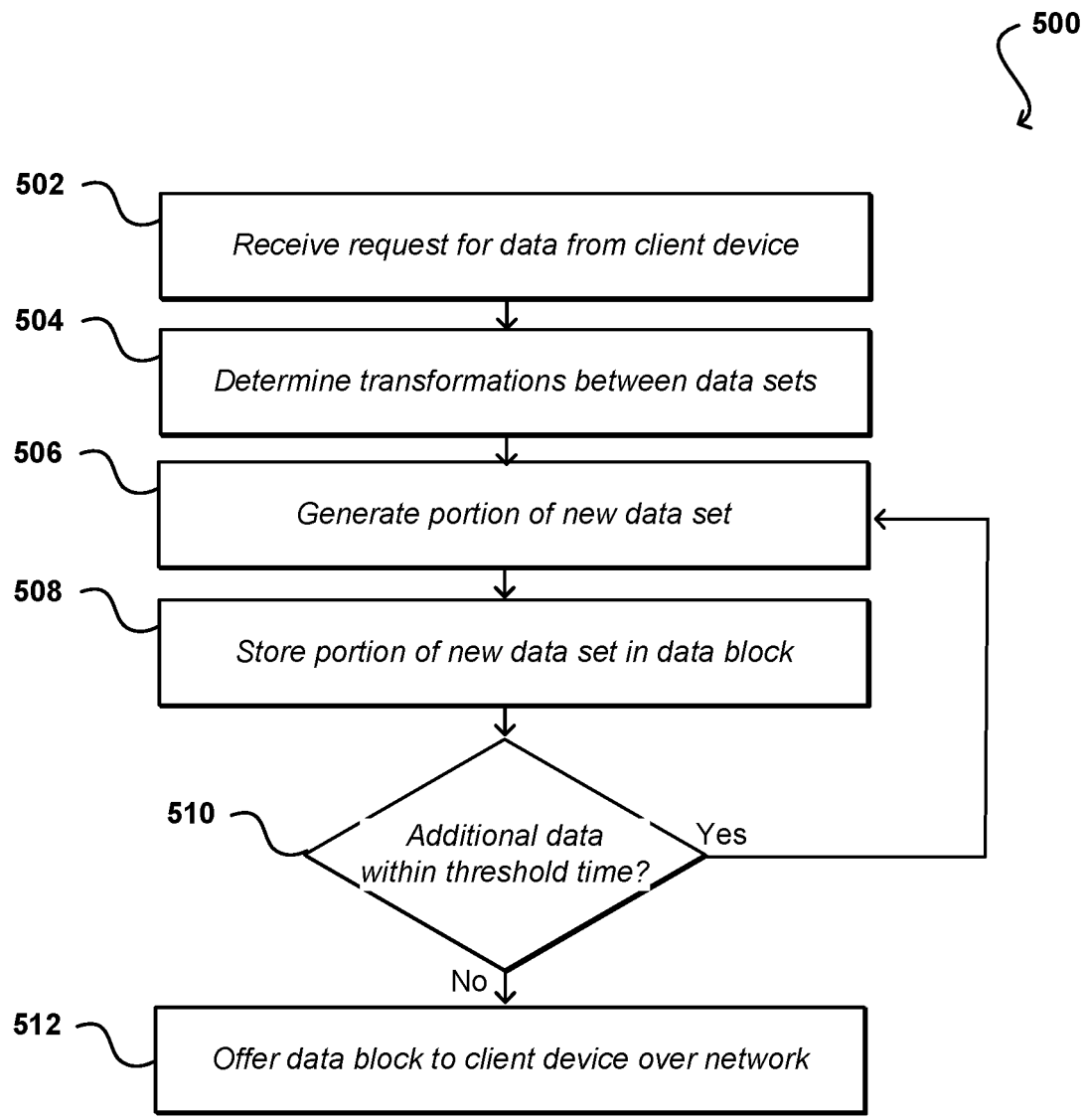
FIG. 5 illustrates an example process for preparing and delivering bulk data to clients, in accordance with various embodiments.

FIG. 5 illustrates an example process 500 for preparing and delivering bulk data to clients, in accordance with various embodiments. In the example 500 of FIG. 5, a request is received 502 for a data set, for example a request from an application executing on a client device that requires data in a first format that is made to a service that maintains the requested data in an incompatible different format. A transformation between the required data set and the existing data set is determined 504, as discussed herein. A portion of the new data set is generated 506 and stored 508, for example in a data block of the newly-created database, although the nature of the storing may be performed in various ways, as discussed above.

A determination is made 510 whether additional data is to be stored in the data block; for example, if the data block is not filled, then additional data may be stored in it. However, because the requesting client would like the data made available as soon as possible, it may be inefficient to wait on additional data that may not be immediately forthcoming, for example because of processing delays. According to an embodiment, if a threshold amount of time passes without new data being stored in the block, or an indication being received that additional data is forthcoming, then the data block may be "closed" to additional data and the data block offered 512 to the client device via a streaming approach as discussed herein. If additional data is received or indicated to be forthcoming, then the process loops back, for example to step 506 to generate additional data for the data block, and the new data is stored in the data block. In various embodiments, new data may have already been generated but just not received within a threshold time or by a threshold event; therefore, the current data block would not store the new data, but another data block would. According to various embodiments, the determination may include a time threshold as well as a determination whether the data block is full.

Figure 6:
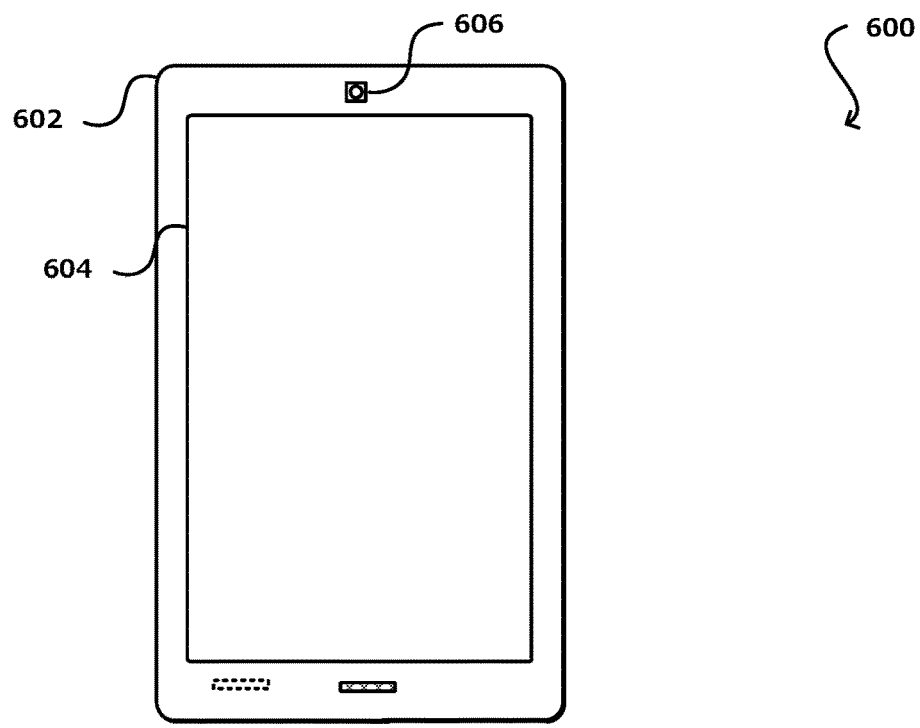
FIG. 6 illustrates an example device that can be used to implement aspects of the various embodiments.

FIG. 6 illustrates an example 600 of an electronic user device 602 (e.g., device 104 in FIG. 1A) that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 602 has a display screen 604 on the front side, which under normal operation will display information to a user facing the display screen (e.g., on the same side of the computing device as the display screen). The computing device in this example includes at least one camera 606 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 602 also includes at least one microphone 608 or other audio capture device capable of capturing audio data, such as words or commands spoken by a user of the device. In this example, a microphone 606 is placed on the same side of the device as the display screen 604, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 602 also includes at least one orientation sensor, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

The example computing device 602 may include at least one touch-sensitive surface, for example coupled to the display screen 604, or the display screen 604 may be a touch-sensitive surface. The example computing device 602 may also include at least one component for detecting touch to the at least one touch-sensitive surface, including at least duration and/or pressure of such touches, as well as at least one component for detecting gestures, for example made by touching the touch-sensitive surface with a finger and moving the finger in a pattern while maintaining contact with the touch-sensitive surface.

Figure 7:
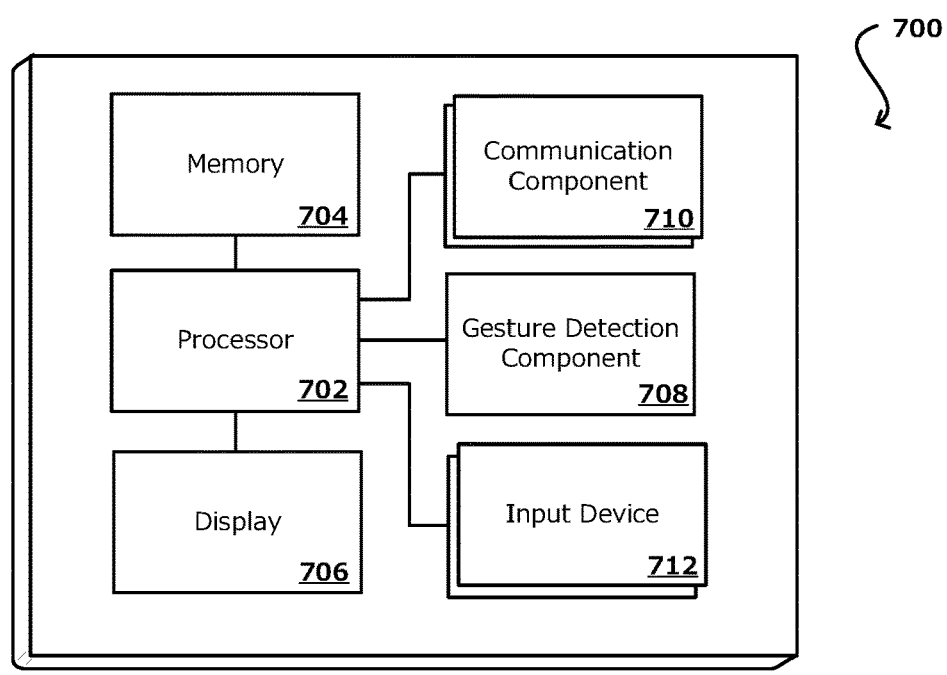
FIG. 7 illustrates an example set of basic components of a computing device, such as the device described with respect to FIG. 6.

FIG. 7 illustrates a logical arrangement of a set of general components of an example computing device 700 such as the device 702 described with respect to FIG. 6. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. The device in many embodiments will include at least one gesture detection element 708, which may include elements to detect touch on a touch-sensitive surface, as well as deciphering the use of touch patterns (e.g., tracing of a finger, number of touches, duration and/or pressure of touch, etc.) that can be determined by the processor and/or the at least one gesture detection element 708. The device in many embodiments will include at least one image capture element (not pictured) such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 700 of FIG. 7 can include one or more communication elements 710, such as a Wi-Fi, Bluetooth, RF, wired, or wireless communication system. The device in many embodiments can communicate with a network, such as the Internet, and may be able to communicate with other such devices. In some embodiments the device can include at least one additional input component 712 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include at least one orientation or motion sensor or component (not shown). As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

Figure 8:
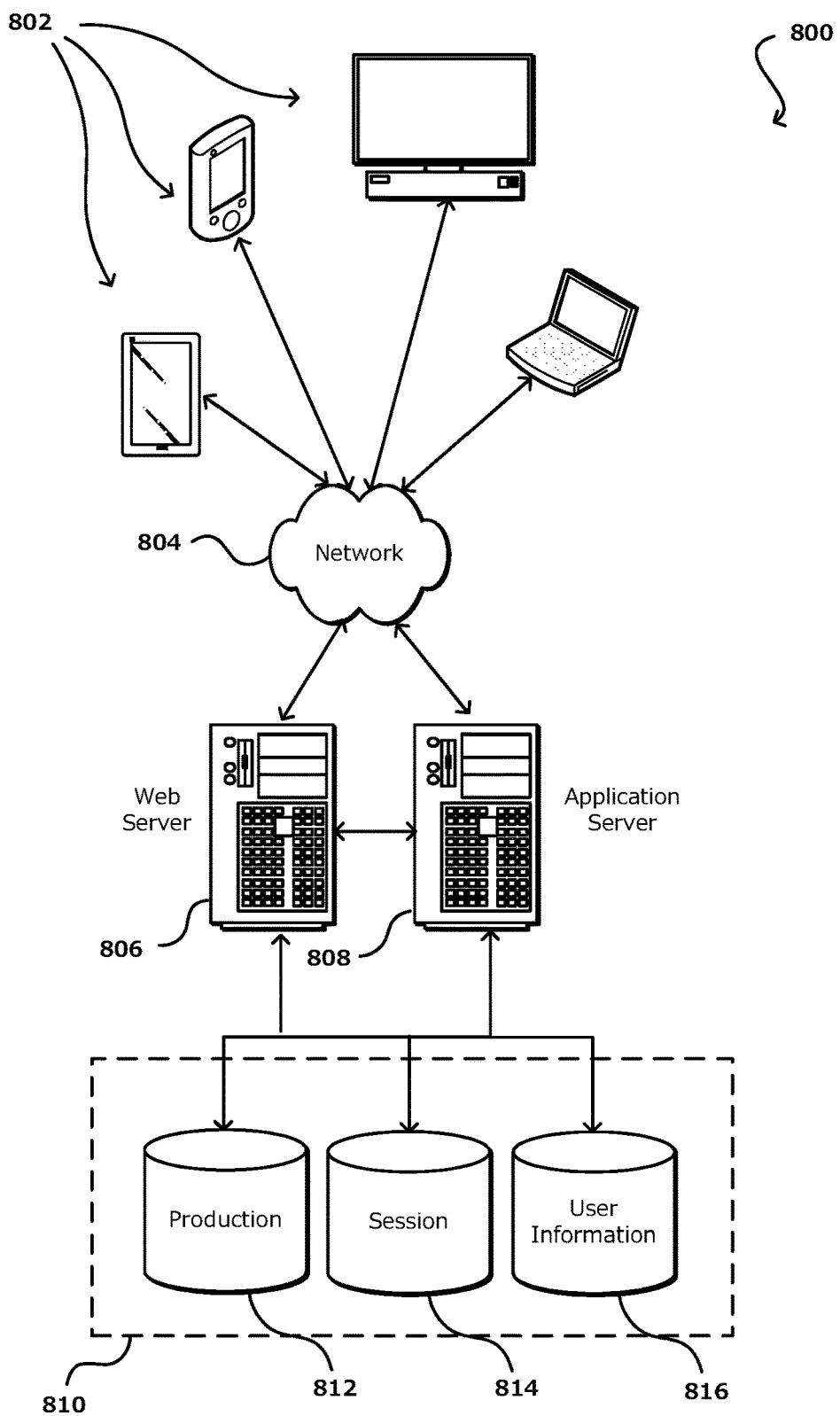
FIG. 8 illustrates an example environment in which various embodiments can be implemented.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 802. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method comprising:
generating, at a multi-tenant computing environment, a first database having a first schema and a first data model;
receiving, from a client computing device, a request to create a second database having a second schema and a second data model, wherein the second schema differs from the first schema and the second data model differs from the first data model;
receiving, from the client computing device, a first transformation specification comprising a description of the second schema;
receiving, from the client computing device, a second transformation specification comprising a mapping between the first data model and the second data model;
determining, at the multi-tenant computing environment, a transformation between the first schema and the second schema, the transformation being based at least on the first transformation specification and the second transformation specification;
generating, at the multi-tenant computing environment, the second database based on the transformation, the second database compatible with the second schema and the second data model;
storing the second database at the multi-tenant computing environment;
generating a link to the second database; and
transmitting the link from the multi-tenant computing environment to the client computing device in response to a request from the client computing device.

2. The computer-implemented method of claim 1, wherein generating the second database further comprises:
retrieving a first plurality of records and a second plurality of records from the first database;
performing the transformation on the first plurality of records and the second plurality of records to generate a first transformed plurality of records and a second transformed plurality of records; and
storing the first transformed plurality of records into a first data block of the second database and the second transformed plurality of records into a second data block of the second database,
wherein the first data block and the second data block upon being stored are made available to a server executing at the multi-tenant computing environment.

3. The computer-implemented method of claim 2, further comprising:
receiving, from the client computing device, an request at the server, wherein the request operates to request a stream of data blocks comprising the second database; and
providing, in response to the request, the first data block and the second data block to the client computing device in a read-only mode, wherein the first data block is received by the client computing device prior to the second data block,
wherein the first data block is associated with a first offset and the second data block is associated with a second offset, the first and second offset respectively defining different positions within a file comprising the second database.

4. The computer-implemented method of claim 2, further comprising:
determining, after the first transformed plurality of records are stored into the first data block, that the first data block is capable of storing additional records;
determining that a threshold amount of time has passed since the first transformed plurality of records were stored into the first data block without additional records being stored into the first data block; and
providing the first data block to the server, wherein the first data block is indicated as being unavailable for storage of additional records.

5. A computer-implemented method, comprising:
receiving, from a client device, a request to create a first database, wherein the request includes data comprising a schema and a data model compatible with an application executing on the client device;
determining a transformation between the first database and a second database based at least on the schema description and the data model, wherein the second database has at least one of a schema or a data model different from the first database and is stored at a multi-tenant computing environment;
generating the first database based at least on the transformation, the first database compatible with the schema and the data model;
storing the first database at the multi-tenant computing environment; and
providing the first database to the client device, wherein the first database is capable of being utilized by the application without additional processing.

6. The method of claim 5, wherein providing the first database to the client device further comprises:
generating a link capable of accessing the first database at the multi-tenant computing environment; and
transmitting the link from the multi-tenant computing environment to the client device in response to a request from the client device.

7. The method of claim 5, wherein generating the first database further comprises:
retrieving a plurality of records from the second database;
performing the transformation on the plurality of records to generate a transformed plurality of records;
storing the transformed plurality of records into a data block of the first database; and
providing the stored transformed plurality of records to a server executing at the multi-tenant computing environment.

8. The method of claim 7, further comprising:
receiving a request from the client device to stream one or more data blocks from the server executing at the multi-tenant computing environment; and
providing, in response to the request, the data block to the client device in a read-only mode,
wherein the data block is associated with an offset value defining a position of the data block in a file comprising the first database.

9. The method of claim 7, further comprising:
determining that the data block is capable of storing records in addition to the transformed plurality of records;
determining that a threshold amount of time has passed since the transformed plurality of records were stored in the data block; and
providing the data block to the server without storing records in addition to the transformed plurality of records.

10. The method of claim 5, further comprising:
providing an Application Programming Interface (API) at the multi-tenant computing environment; and
receiving, at the API, the schema description and the data model from the client device.

11. The method of claim 5, wherein the schema description comprises a Structured Query Language (SQL) representation and the data model comprises a JavaScript Object Notation (JSON) representation defining a mapping between the data model included in the request and the data model associated with the second database.

12. The method of claim 5, wherein the request further includes additional processing instructions, and further comprising:
   determining that the first database has completed generating; and
   applying the additional processing instructions to the first database,
   wherein the additional processing instructions comprise at least one of data normalization, data denormalization, index generation, data source merging, data pruning, data modifications, data definitions, or data sanitizing.

13. A non-transitory computer-readable storage medium including instructions that, when executed by at least one processor of a computing system, cause the at least one processor to:
   receive, from a client device, a request to create a first database, wherein the request includes data comprising a schema and a data model compatible with an application executing on the client device;
   determine a transformation between the first database and a second database based at least on the schema description and the data model, wherein the second database has at least one of a schema or a data model different from the first database and is stored at a multi-tenant computing environment;
   generate the first database based at least on the transformation, the first database compatible with the schema and the data model;
   store the first database at the multi-tenant computing environment; and
   provide the first database to the client device, wherein the first database is capable of being utilized by the application without additional processing.

14. The non-transitory computer-readable storage medium of claim 13, wherein the instructions for providing the first database to the client when executed further cause the at least one processor to:
   generate a link capable of accessing the first database at the multi-tenant computing environment; and
   transmit the link from the multi-tenant computing environment to the client device in response to a request from the client device.

15. The non-transitory computer-readable storage medium of claim 13, wherein the instructions for generating the first database when executed further cause the at least one processor to:
   retrieve a plurality of records from the second database;
   perform the transformation on the plurality of records to generate a transformed plurality of records;
   store the transformed plurality of records into a data block of the first database and
   provide the stored transformed plurality of records to a server executing at the multi-tenant computing environment.

16. The non-transitory computer-readable storage medium of claim 15, wherein the instructions when executed further cause the at least one processor to:
   receive a request from the client device to stream one or more data blocks from the server executing at the multi-tenant computing environment; and
   provide, in response to the request, the data block to the client device in a read-only mode,
   wherein the data block is associated with an offset value defining a position of the data block in a file comprising the first database.

17. The non-transitory computer-readable storage medium of claim 15 wherein the instructions when executed further cause the at least one processor to:
   determine that the data block is capable of storing records in addition to the transformed plurality of records;
   determine that a threshold amount of time has passed since the transformed plurality of records were stored in the data block; and
   provide the data block to the server without storing records in addition to the transformed plurality of records.

18. The non-transitory computer-readable storage medium of claim 13, wherein the instructions when executed further cause the at least one processor to:
   provide an Application Programming Interface (API) at the multi-tenant computing environment; and
   receive, at the API, the schema description and the data model from the client device.

19. The non-transitory computer-readable storage medium of claim 13, wherein the schema description comprises a Structured Query Language (SQL) representation and the data model comprises a JavaScript Object Notation (JSON) representation defining a mapping between the data model included in the request and the data model associated with the second database.

20. The non-transitory computer-readable storage medium of claim 13, wherein the request further includes additional processing instructions and wherein the instructions when executed further cause the at least one processor to:
   determine that the first database has completed generating; and
   apply the additional processing instructions to the first database,
   wherein the additional processing instructions comprise at least one of data normalization or data sanitizing.

* * * * *